(12) United States Patent
Katsumata et al.

(10) Patent No.: US 10,784,017 B2
(45) Date of Patent: Sep. 22, 2020

(54) LINE-SHAPED ASSEMBLY

(71) Applicant: Yazaki Corporation, Minato-ku, Tokyo (JP)

(72) Inventors: Makoto Katsumata, Susono (JP);
Hideomi Adachi, Makinohara (JP);
Takeshi Ogue, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 586 days.

(21) Appl. No.: 14/749,742

(22) Filed: Jun. 25, 2015

(65) Prior Publication Data
US 2015/0294765 A1    Oct. 15, 2015

Related U.S. Application Data

(63) Continuation of application No. PCT/JP2013/083459, filed on Dec. 13, 2013.

(30) Foreign Application Priority Data

Dec. 25, 2012  (JP) .................................. 2012-280595

(51) Int. Cl.
*H01B 7/29*     (2006.01)
*F16L 11/20*    (2006.01)
(Continued)

(52) U.S. Cl.
CPC .................. *H01B 7/29* (2013.01); *B32B 1/08* (2013.01); *B32B 3/28* (2013.01); *B32B 15/04* (2013.01);
(Continued)

(58) Field of Classification Search
CPC .......... H02G 3/00; H02G 3/04; H02G 3/0468; H01B 7/29; F16L 11/11; F16L 11/12;
(Continued)

(56) References Cited

U.S. PATENT DOCUMENTS 5,305,799 A * 4/1994 Dal Palu .................. F16L 11/11
138/109
5,469,892 A * 11/1995 Noone .................... B32B 27/36
138/121
(Continued)

FOREIGN PATENT DOCUMENTS

JP    2005-235409 A    9/2005
JP    2010-051042 A    3/2010
(Continued)

OTHER PUBLICATIONS

Mar. 25, 2014—(WO) Written Opinion of the ISA—App PCT/JP2013/083459, Eng Tran.
(Continued)

*Primary Examiner* — Tu B Hoang
*Assistant Examiner* — Alba T Rosario-Aponte
(74) *Attorney, Agent, or Firm* — Banner & Witcoff, Ltd.

(57) ABSTRACT

A line-shaped assembly includes a heat source that includes a heat source main body extending straightly and a heat source cover member covering the heat source main body, and a tubular-shaped heat source protective member that accommodates and protects the heat source. The heat source protective member is made of resin, and includes a first tube body portion with an inner surface that has a small area per unit length in an axial direction of the heat source protective member in contact with the heat source, and a second tube body portion with an inner surface that has a contact area larger than that of the first tube body portion.

10 Claims, 4 Drawing Sheets

(51) Int. Cl.
- *B32B 1/08* (2006.01)
- *B60R 16/02* (2006.01)
- *F16L 11/12* (2006.01)
- *B32B 15/04* (2006.01)
- *B32B 3/28* (2006.01)
- *B32B 15/08* (2006.01)
- *B32B 15/20* (2006.01)
- *F16L 57/00* (2006.01)
- *F16L 59/14* (2006.01)
- *F16L 59/153* (2006.01)

(52) U.S. Cl.
CPC .............. *B32B 15/08* (2013.01); *B32B 15/20* (2013.01); *B60R 16/0215* (2013.01); *F16L 11/12* (2013.01); *F16L 11/20* (2013.01); *F16L 57/00* (2013.01); *F16L 59/143* (2013.01); *F16L 59/153* (2013.01); *B32B 2307/20* (2013.01); *B32B 2307/302* (2013.01); *B32B 2605/00* (2013.01)

(58) Field of Classification Search
CPC .......... F16L 11/15; F16L 11/125; F01P 11/04; Y10S 138/07
USPC ....... 219/202, 205, 206, 207, 208; 174/70 R, 174/135, 72 A, 15.6; 138/137, 138, 139, 138/118.1, 120, 121, 127
See application file for complete search history.

(56) References Cited

U.S. PATENT DOCUMENTS

| | | | |
|---|---|---|---|
| 5,850,855 A * | 12/1998 | Kerschbaumer | F16L 11/15 138/121 |
| 8,563,866 B2 | 10/2013 | Oga et al. | |
| 2004/0076783 A1* | 4/2004 | Norman | B32B 1/08 428/36.91 |
| 2004/0256017 A1* | 12/2004 | Arima | B29D 23/001 138/126 |
| 2006/0011250 A1* | 1/2006 | Ikemoto | B60H 1/00571 138/126 |
| 2011/0067920 A1* | 3/2011 | Toyama | B60R 16/0207 174/72 A |
| 2011/0132638 A1 | 6/2011 | Oga et al. | |
| 2011/0133548 A1* | 6/2011 | Toyama | B60R 16/0215 307/9.1 |
| 2012/0261185 A1* | 10/2012 | Murao | B60R 16/0207 174/72 A |
| 2012/0305308 A1* | 12/2012 | Toyama | B60R 16/0207 174/70 R |

FOREIGN PATENT DOCUMENTS

| | | | |
|---|---|---|---|
| JP | 2012043778 A | * | 3/2012 |
| JP | 2012-210101 A | | 10/2012 |
| JP | 2012210101 A | * | 10/2012 |

OTHER PUBLICATIONS

Mar. 25, 2014—International Search Report—Intl App PCT/JP2013/083459.

May 31, 2016—(JP) Notification of Reasons for Refusal—App 2012-280595.

* cited by examiner

LINE-SHAPED ASSEMBLY

CROSS REFERENCE TO RELATED APPLICATION

This application is a continuation of PCT application No. PCT/JP2013/083459, which was filed on Dec. 13, 2013 based on Japanese Patent Application (No. 2012-280595) filed on Dec. 25, 2012, the contents of which are incorporated herein by reference. Also, all the references cited herein are incorporated as a whole.

BACKGROUND

1. Technical Field

The present invention relates to a line-shaped assembly that includes a heat source which extends straightly, and a tubular-shaped heat source protective member that accommodates and protects the heat source.

2. Background Art

A heat source may be one of substances in various phases, for example, gas, liquid, and a solid. For example, when a heat source such as gas or liquid is heated, a container or a tube (that is, an object covering a heat source) for the storage and the flow of the heat source is required. Since the touching of a heated solid may become dangerous, the heated solid is required to be coated. As such, the heat source includes gas, liquid, or a solid which is heated, and a cover member that covers the gas, liquid, or solid.

When the usage patterns of these heat sources are taken into consideration, a protective member is required to protect the heat source. For example, when a heat source is formed in a shape such that the heat source extends straightly, a protective member is formed in a tubular shape to match that shape.

In various industrial fields, a hose is used for the flow of high-temperature gas or liquid. For example, in the field of transportation equipment, a heat source is equivalent to a combination of a coolant for cooling an engine, and a radiator hose for flowing the coolant heated by the engine to a radiator.

In an example of a solid instead of the above-described liquid, a heat source is equivalent to an electrical wire or a bundle of electrical wires for the connection of vehicle-mounted equipment. The electrical wire includes a conductor for flowing electricity, and an insulator that covers the conductor. When electricity flows through the conductor, the electrical wire generates heat. A high voltage electrical wire is an example of an electrical wire having a large amount of heat generation (refer to JP-A-2010-51042).

A corrugated tube is an example of a protective member that protects a straight heat source. However, when the heat source is protected using a corrugated tube, heat originating from the heat source may be trapped in the corrugated tube.

Accordingly, it is an effective countermeasure for this problem to efficiently transfer the heat originating from the heat source to the corrugated tube, and to dissipate the heat through an outer surface of the corrugated tube. However, since the corrugated tube is formed in a bellows shape, a contact area between an inner surface of the corrugated tube and the heat source is small. For this reason, the heat originating from the heat source is unlikely to be efficiently transferred to the corrugated tube. As a result, the corrugated tube cannot be a satisfactory countermeasure.

Since the entirety of the corrugated tube is bent, when the length of the corrugate tube is long, a portion of the corrugated tube may be bent, which is desired not to be bent much. For this reason, it is necessary to post-attach another rigid member to the corrugate tube.

SUMMARY

The present invention is made in light of these problems, and an object of the present invention is to provide a line-shaped assembly that can efficiently transfer heat originating from a heat source to a heat source protective member, and dissipate the heat.

In order to achieve this object, a line-shaped assembly according to the present invention has the following characteristics (1) to (8).

(1) A line-shaped assembly includes a heat source that includes a heat source main body which extends straightly, and a heat source cover member that covers the heat source main body; and a tubular-shaped heat source protective member that accommodates and protects the heat source. The heat source protective member is made of resin, and includes a first tube body portion with an inner surface that has a small area per unit length in an axial direction of the heat source protective member in contact with the heat source, and a second tube body portion with an inner surface that has a contact area larger than that of the first tube body portion.

In the line-shaped assembly disclosed in (1), the heat source protective member includes the second tube body portion as a configuration member, and a contact area of the heat source protective member with respect to the heat source can be larger than that of the heat source protective member, the entirety of which has a bellows shape. Accordingly, heat originating from the heat source can be efficiently transferred to the heat source protective member. In the line-shaped assembly disclosed in (1), since the heat source protective member is made of resin, attributively, the heat source protective member easily emits heat compared to the heat source protective member made of metal. For example, the first tube body portion preferably has a bellows shape.

As a result, in the line-shaped assembly disclosed in (1), heat originating from the heat source can be efficiently transferred to the heat source protective member and be dissipated.

(2) In the line-shaped assembly disclosed (1), the second tube body portion is formed so as to include a flat inner surface.

In the line-shaped assembly disclosed in (2), since the second tube body portion has a flat inner surface, even when a plurality of the heat sources are provided, the heat sources are brought into contact with each other while lining up side by side, and thereby the heat sources can come into contact with the flat surface.

As a result, in the line-shaped assembly disclosed in (2), heat originating from the heat source can be efficiently transferred to the heat source protective member.

(3) In the line-shaped assembly disclosed in (1) or (2), the heat source protective member is integrally molded so that the first tube body portion and the second tube body portion are successive in the axial direction of the heat source protective member.

In the line-shaped assembly disclosed in (3), since the heat source protective member is made of resin, the heat source protective member can be integrally molded in such a manner that the first tube body portions and the second tube body portions are successive. Accordingly, it is possible to omit a member (that is, a connection member) for connecting the first tube body portion and the second tube body portion. Since the connection member is not required, it is possible to reduce the number of components, and to prevent an occurrence of a step or the like between the first tube body portion and the second tube body portion. As a result, it is possible to prevent an occurrence a state in which the heat source is not in contact with the inner surface of the heat source protective member, that is, an occurrence of a gap therebetween.

As a result, in the line-shaped assembly disclosed in (3), heat originating from the heat source can be efficiently transferred to the heat source protective member. In addition, it is possible to reduce the number of components.

(4) In the line-shaped assembly disclosed in any one of (1) to (3), the line-shaped assembly is attached to both of an interior and an exterior of a structural body, and at least a part of the second tube body portion of the heat source protective member is disposed in the exterior of the structural body.

In the line-shaped assembly disclosed in (4), since at least a part of the second tube body portion is disposed in the exterior of the structural body, the second tube body portion can be exposed to the atmosphere.

As a result, in the line-shaped assembly disclosed in (4), it is possible to set a good environment by virtue of heat dissipation.

(5) In the line-shaped assembly disclosed in (4), the line-shaped assembly is disposed in the exterior of the structural body so that the second tube body portion extends in a substantially horizontal direction.

In the line-shaped assembly disclosed in (5), the weight of the heat source allows the heat source to be in contact with the inner surface of the second tube body portion.

As a result, in the line-shaped assembly disclosed in (5), it is possible to bring the heat source into good contact with the heat source protective member.

(6) In the line-shaped assembly disclosed in any one of (1) to (5), a metal member is disposed in the heat source cover member of the heat source while being close to the heat source protective member, or the metal member is disposed on an outer surface of the heat source cover member while being in contact with the heat source protective member.

In the line-shaped assembly disclosed in (6), heat originating from the heat source can be drawn (in other words, transferred) to the outside by the metal member having good thermal conductivity.

As a result, in the line-shaped assembly disclosed in (6), heat originating from the heat source can be efficiently transferred to the heat source protective member.

(7) In the line-shaped assembly disclosed in (6), the heat source is a conductive path, the metal member is a conductive shield member, and the heat source protective member is an exterior member with no slit.

In the line-shaped assembly disclosed in (7), heat originating from the conductive path can be drawn by the shield member, and thereby heat can be efficiently transferred to the exterior member and be dissipated.

As a result, the line-shaped assembly disclosed in (7) can be applied to a wire harness that has the shield member and is protected with the exterior member.

(8) In the line-shaped assembly disclosed in (7), the conductive path is a high voltage conductive path, and the high voltage conductive path and the exterior member are formed to be long so as to be routed from a front side to a rear side of a vehicle floor through under the vehicle floor.

In the line-shaped assembly disclosed in (8), also when the heat source is a high voltage conductive path having a large amount of heat generation, the generated heat is drawn by the shield member, and thereby the generated heat can be efficiently transferred to the exterior member and be dissipated. In the line-shaped assembly disclosed in (8), since the second tube body portion having a large contact area is disposed in the vehicle underfloor region, it is possible to increase the length of the portion that efficiently dissipates heat. The line-shaped assembly disclosed in (8) can be applied to a long high voltage conductive path and a long exterior member, that is, a long wire harness.

BRIEF DESCRIPTION OF THE DRAWINGS

FIG. 1A is a perspective view illustrating the configuration, and FIG. 1B is a vertical cross-sectional view.

FIG. 2A is a side view, and FIG. 2B is a horizontal cross-sectional view illustrating a partially fractured portion.

FIG. 3A is a vertical cross-sectional view, and FIG. 3B is a view illustrating the movement of heat in FIG. 3A.

FIG. 4A is a vertical cross-sectional view, and FIG. 4B is a vertical cross-sectional view illustrating a comparative example.

DETAILED DESCRIPTION OF THE EXEMPLARY EMBODIMENTS

According to each embodiment of the present invention which will be described below, a line-shaped assembly adopts a heat source protective member that is made of resin and has a large area in contact with a heat source compared to that of the above-mentioned corrugated tube in the related art.

Hereinafter, a radiator hose unit between an engine and a radiator will be described as an example of the line-shaped assembly (Embodiment 1). This radiator hose unit adopts a radiator hose protective member that has a large area in contact with a heat source including a coolant and a radiator hose, and in the radiator hose unit, heat of the coolant heated by the engine is efficiently transferred to the radiator hose protective member and is dissipated.

Thereafter, a wire harness will be described as another example of the line-shaped assembly (Embodiments 2 and 3). This wire harness adopts an exterior member that is made of resin and has a large area in contact with a conductive path, and in this wire harness, heat originating from the conductive path is efficiently transferred to the exterior member and is dissipated. The conductive path includes a metal member that can draw (that is, transfer) heat originating from a core wire (that is, a conductor) to the exterior member.

Embodiment 1

Figure 1A:
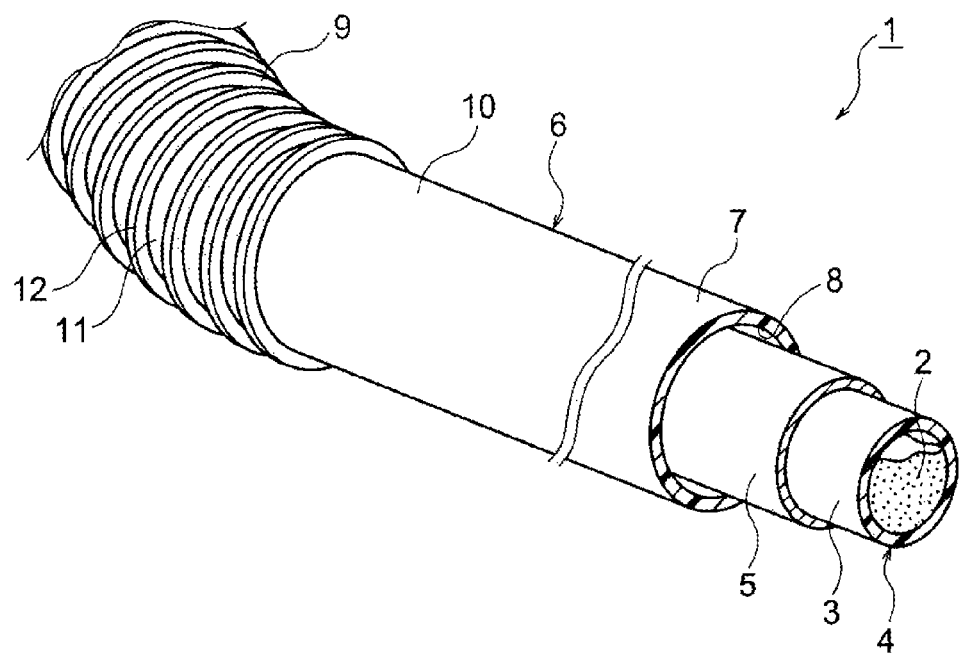
FIGS. 1A and 1B are views illustrating a radiator hose unit that is a line-shaped assembly of Embodiment 1.
Figure 1B:
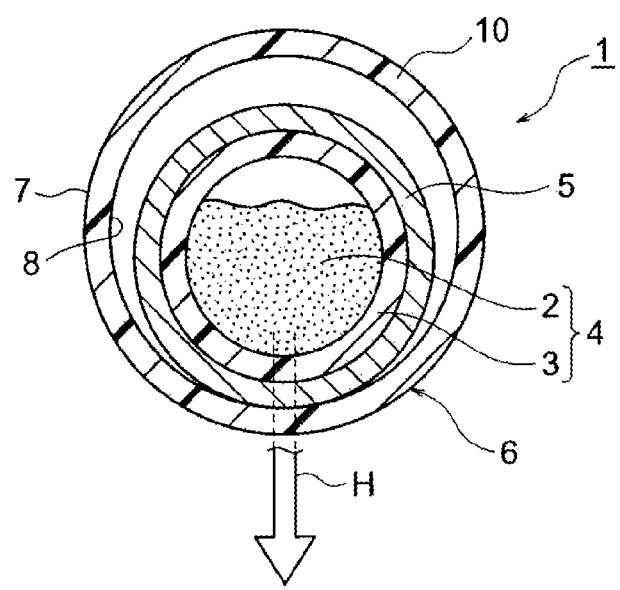
Figure 2A:
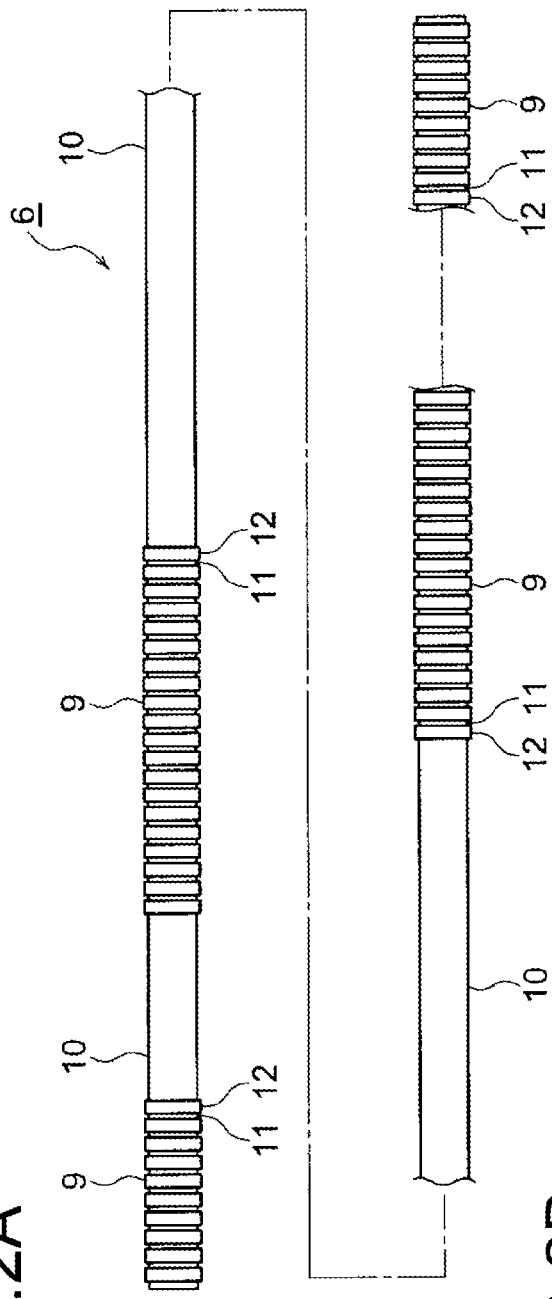
FIGS. 2A and 2B are views illustrating a radiator hose protective member illustrated in FIGS. 1A and 1B.
Figure 2B:
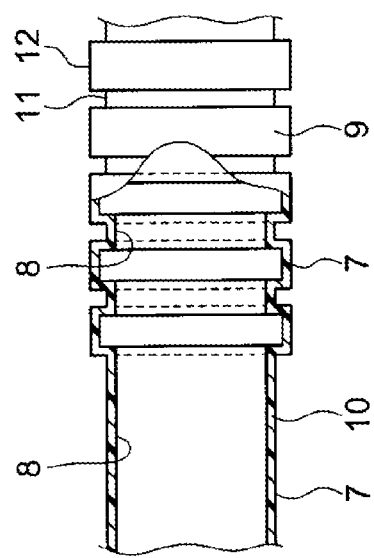

Hereinafter, Embodiment 1 will be described with reference to FIGS. 1A to 2B. FIGS. 1A and 1B are views illustrating a radiator hose unit that is a line-shaped assembly of Embodiment 1, FIG. 1A is a perspective view illustrating the configuration, and FIG. 1B is a vertical cross-sectional view. FIGS. 2A and 2B are views illustrating a radiator hose protective member illustrated in FIGS. 1A and 1B, FIG. 2A is a side view, and FIG. 2B is a horizontal cross-sectional view illustrating a partially fractured portion.

In FIGS. 1A and 1B, reference sign 1 denotes a radiator hose unit equivalent to the line-shaped assembly. The radiator hose unit 1 is attached to an engine (not illustrated) (in other words, a structural body) and a radiator (not illustrated) (in other words, a structural body). The radiator hose unit 1 includes a heat source 4 that is a combination of a coolant (that is, a heat source main body) 2 that cools the engine, and a radiator hose (that is, a heat source cover member) 3 through which the coolant 2 heated by the engine flows toward the radiator. The radiator hose unit 1 further includes a metal member 5 that is provided to cover an outer surface of the radiator hose 3, and a radiator hose protective member (that is, a heat source protective member) 6 that accommodates and protects the heat source 4 covered with the metal member 5.

The engine and the radiator (not illustrated) are equivalent to structural bodies. The radiator hose unit 1 is attached to these structural bodies. The radiator hose unit 1 has a portion exposed to the outside of the structural body. That is, the radiator hose unit 1 is attached to the interior and the exterior of the structural body.

The coolant 2 is liquid for cooling the engine as described above, and flows toward the radiator in a state where the coolant 2 is heated by the engine. A well-known coolant is used as the coolant 2. The level of the coolant 2 is exemplarily illustrated in the drawings.

In the example illustrated in Embodiment 1, liquid is a configuration element of the heat source 4; however, the present invention is not limited to that configuration, and gas may be a configuration element. A specific example of gas is vapor in boiler equipment. As described above, the application of the present invention is not limited to the field of transportation equipment, and the present invention can be applied to various fields.

The radiator hose 3 is a hose (in other words, a tube) made of resin, and is formed so as to have a circular cross section. The radiator hose 3 is formed so as to have a predetermined diameter and a predetermined hose thickness. The radiator hose 3 is formed to be flexible. Connecting means (not illustrated) is attached to each end of the radiator hose 3, and connects the radiator hose 3 and each of the engine and the radiator. In Embodiment 1, a well-known radiator hose is used as the radiator hose 3.

As described above, the coolant 2 heated by the engine flows through the radiator hose 3, and a combination of the radiator hose 3 and the coolant 2 is equivalent to the heat source 4. The heat source 4 is a straight heat source.

The heat source 4 may be a heat source that thermally affects the outside, or a heat source through which heat originating from one structural body affects the other structural body. The heat source 4 may be broken or damaged by external factors and be required to be protected.

The metal member 5 is made of a metallic material having good thermal conductivity, and in Embodiment 1, the metal member 5 is formed of a braid into which a plurality of element wires are braided. The braided metal member 5 is provided in such a manner as to be in close contact with the outer surface of the radiator hose 3. The metal member 5 is not limited to a braid, and for example, the metal member 5 may be formed by wrapping a metal foil or the like around the radiator hose 3.

Since the metal member 5 has good thermal conductivity as described above, the metal member 5 serves to draw heat from the heat source 4. That is, the metal member can draw heat. The metal member 5 is effective in efficiently transferring heat from the heat source 4 to the radiator hose protective member 6. The metal member 5 not only covers the entirety of an outer surface of the heat source 4 as in Embodiment 1, but also may be disposed only at positions in which the metal member 5 is in contact with the radiator hose protective member 6.

In FIGS. 1A to 2B, the radiator hose protective member 6 is a tubular body that is made of resin and protects the heat source 4 from external factors, and as illustrated in FIGS. 1A to 2B, the radiator hose protective member 6 is formed in a shape such that the radiator hose protective member 6 has a length required to accommodate the straight heat source 4 and a thickness required to protect the heat source 4. The radiator hose protective member 6 is formed in a shape such that the radiator hose protective member 6 does not have a slit connecting an outer surface 7 and an inner surface 8 thereof. In Embodiment 1, the radiator hose protective member 6 is illustrated in the long shape; however, the present invention is not limited to that length.

In Embodiment 1, the radiator hose protective member 6 is formed so as to have a circular cross section. The circular cross section is an example, and the radiator hose protective member 6 may have a track-shaped cross section, an elliptical cross section, or a rectangular cross section insofar as the radiator hose protective member 6 with this shape can accommodate the heat source 4 and ensure contact with the heat source 4. The radiator hose protective member 6 has a plurality of flexible tube portions (that is, first tube body portions) 9, and a plurality of non-flexible tube portions (that is, second tube body portions) 10 not having the same degree of flexibility as that of the flexible tube portions 9 (in other words, having flexibility lower than that of the flexible tube portion 9).

The flexible tube portions 9 and the non-flexible tube portions 10 are integrally resin-molded (that is, integrally molded) in such a manner that the entirety thereof is straight in a state where the flexible tube portions 9 are not bent. The flexible tube portions 9 and the non-flexible tube portions 10 are disposed in such a manner as to be alternately successive.

The flexible tube portion 9 is disposed at a position in which the flexible tube portion 9 matches the shape of a mating attachment portion. The flexible tube portion 9 is formed so as to have a length such that the flexible tube portion 9 matches the shape of the mating attachment portion. Since the respective lengths of the flexible tube portions 9 are different from each other in an axial direction of the tube, the flexible tube portion 9 can be bent so as to have a necessary length such that the flexible tube portion 9 matches the shape of the mating attachment portion. The flexible tube portion 9 can be bent at a desired angle.

It is possible to form the flexible tube portion 9 in a bent shape, and to return the flexible tube portion 9 to an original straight shape.

The flexible tube portion 9 is formed in a bellows shape. The shape of the flexible tube portion 9 is not particularly limited. Specifically, the flexible tube portion 9 has a concave portion 11 and a convex portion 12 which extend in a circumferential direction, and the concave portions 11 and the convex portions 12 are formed in such a manner as to be alternately successive in the axial direction of the tube. Since the flexible tube portion 9 has the concave portions 11 and the convex portions 12, an inner surface of the flexible tube portion 9 is in point contact with a plurality of regions on the heat source 4 covered with the metal member 5. That is, the flexible tube portion 9 has a relatively small contact area between the inner surface thereof and the heat source 4.

Portions of the radiator hose protective member 6 are formed in a corrugated shape, the flexible tube portions 9 being respectively disposed in the portions. In other words, the radiator hose protective member 6 is formed in a shape such that the corrugated tubes are partially formed therein. Since the radiator hose protective member 6 has the corrugated tube portions as described above, the radiator hose protective member 6 can be seen as a "corrugated tube", a "partially corrugated tube", or the like.

The radiator hose protective member 6 is formed in a shape such that a slit is not provided along the axial direction of the tube (that is, there is no axial split). The reason for not providing the slit is that water is prevented from intruding into the radiator hose protective member 6 and waterproof properties improve. Another reason for not providing the slit is that the heat source 4 covered with the metal member 5 is prevented from sticking out of the bent portions. Still another reason for not providing the slit is that an improvement in the rigidity of the radiator hose protective member 6 is obtained. In addition, the radiator hose protective member 6 is preferably formed in a shape such that seams are not formed in the circumferential direction. The reasons are the same as in the slit.

The radiator hose protective member 6 may be split at predetermined positions insofar as the above-mentioned points can satisfied. In this case, the split members are integrally formed via bonding, welding, or a post attachment member for connecting the split members. In the structure where the post attachment members are used for the integration of the split members, preferably, there is no gap between the heat source 4 and the metal member 5 that covers the heat source 4.

The non-flexible tube portion 10 is formed as a non-bent portion (the non-bent portion indicating a portion that does not have active flexibility). The non-flexible tube portion 10 is formed in a straight shape with a circular cross section. The shape of the non-flexible tube portion 10 is not limited to a circular cross section, and may be a track-shaped cross section, an elliptical cross section, or a circular cross section.

As illustrated in FIGS. 1A to 2B, the non-flexible tube portion 10 is formed in a straight shape. For this reason, the non-flexible tube portion 10 can be referred to as a "straight tube portion", a "straight portion", or the like. The non-flexible tube portion 10 is formed as a rigid portion compared to the flexible tube portion 9. The non-flexible tube portion 10 is disposed at a position in which the non-flexible tube portion 10 matches the shape of a mating attachment portion, and the non-flexible tube portion 10 is formed so as to have a length such that the non-flexible tube portion 10 matches the shape of the mating attachment portion. The non-flexible tube portion 10 is formed in such a manner that the inner surface 8 has a large area in contact with the heat source 4 covered with the metal member 5 compared to that of the flexible tube portion 9. That is, the non-flexible tube portion 10 is formed in such a manner that a contact area per unit length is large in the axial direction of the tube compared to that of the flexible tube portion 9. Specifically, the non-flexible tube portion 10 is formed so as to have a flat surface without concavities and convexities.

In Embodiment 1, a plurality of the non-flexible tube portions 10 are provided, and one of these non-flexible tube portions 10 is formed to be long (refer to FIG. 2A). Since the non-flexible tube portion 10 is formed to be long, it is possible to further increase a contact area between the non-flexible tube portion 10 and the heat source 4 covered with the metal member 5. It is effective in heat dissipation to dispose the long non-flexible tube portion 10 at a position exposed to the atmosphere.

With the above-mentioned configuration and structure, as illustrated in FIG. 1B, the metal member 5 draws heat from the heat source 4 to the outside. Since the metal member 5 is in contact with the inner surface 8 of the non-flexible tube portion 10 of the radiator hose protective member 6, the drawn heat is transferred a main body of the radiator hose protective member 6. The heat moves in a direction illustrated by arrow H, and finally, the heat is emitted (in other words, dissipated) from the outer surface 7 of the radiator hose protective member 6.

As described above with reference to FIGS. 1A to 2B, in the radiator hose unit 1, since it is possible to increase a contact area via the inner surface 8 of the non-flexible tube portion 10, heat originating from the heat source 4 can be efficiently transferred to the radiator hose protective member 6 and be dissipated.

In the radiator hose unit 1, since the radiator hose protective member 6 is made of resin having good emissivity, it is possible to prevent heat from being trapped in the radiator hose protective member 6 compared to the radiator hose protective member 6 made of pure metal.

Embodiment 2

Figure 3A:
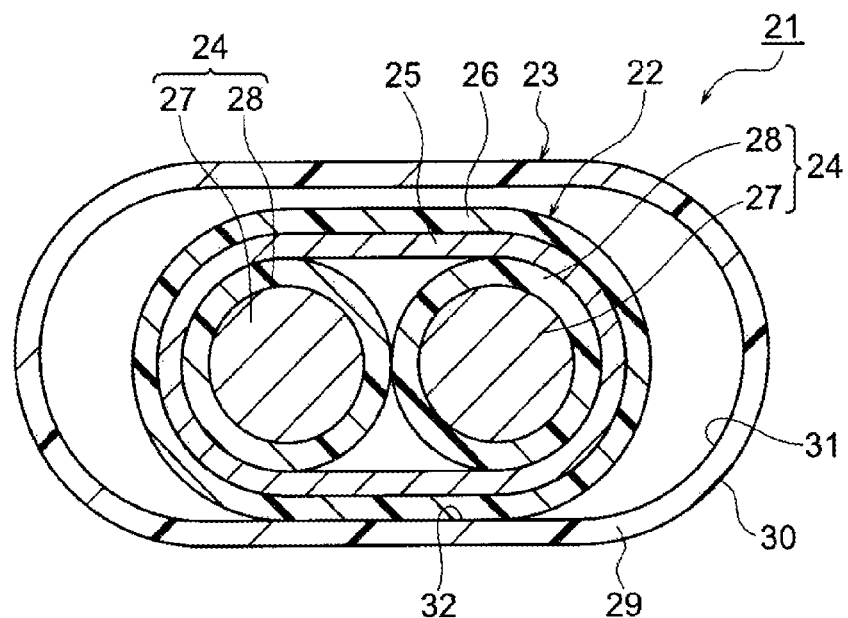
FIGS. 3A and 3B are views illustrating a wire harness that is a line-shaped assembly of Embodiment 2.
Figure 3B:
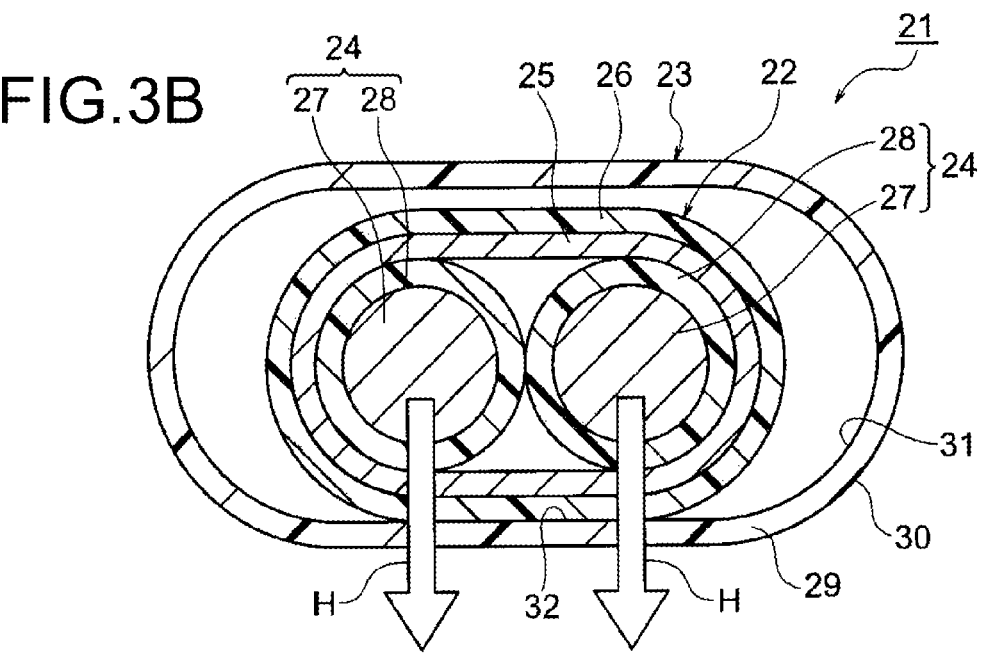

Hereinafter, Embodiment 2 will be described with reference to FIGS. 3A and 3B. FIGS. 3A and 3B are views illustrating a wire harness that is a line-shaped assembly of Embodiment 2, FIG. 3A is a vertical cross-sectional view, and FIG. 3B is a view illustrating the movement of heat in FIG. 3A.

In FIGS. 3A and 3B, reference sign 21 denotes a wire harness equivalent to the line-shaped assembly. Here, a wire harness 21 is a high voltage wire harness (that is, a high voltage wire harness) that is routed in a hybrid vehicle (may be an electric vehicle or a typical vehicle).

The wire harness 21 is routed so as to electrically connect an inverter unit (not illustrated) and a battery (not illustrated). The inverter unit is mounted in an engine compartment, and the battery is mounted in a rear portion of the vehicle. The wire harness 21 is routed between the front and the rear of the vehicle in a vehicle underfloor region. Accordingly, the wire harness 21 is formed to be long.

The inverter unit (not illustrated) and the battery (not illustrated) are equivalent to so-called structural bodies. The radiator hose unit 1 is attached to these structural bodies. The radiator hose unit 1 has a portion exposed to the outside of the structural body. That is, the radiator hose unit 1 is attached to the interior and the exterior of the structural body. This configuration is the same as in Embodiment 3 that will be described later.

The wire harness 21 includes a high voltage conductive path (that is, a heat source) 22 and an exterior member (that is, a heat source protective member) 23 that accommodates and protects the high voltage conductive path 22.

The high voltage conductive path 22 includes two high voltage circuits 24; a shield member (that is, a metal member) 25 that covers the two high voltage circuits 24; and a sheath (that is, a heat source cover member) 26 that is provided on an outer side of the shield member 25. This configuration is merely an example. Here, the high voltage circuit 24 is a well-known high voltage electrical wire, and includes a conductor (that is, a heat source main body) 27 and an insulator (that is, a heat source cover member) 28 for covering the conductor 27.

The conductor 27 is made of copper, a copper alloy, aluminum, an aluminum alloy, or alloys of these materials. The conductor 27 may have any one of a conductor structure in which element wires are twisted together, and a bar-shaped conductor structure (for example, a conductor structure having a flat single core or a round single core, and in this case, the electrical wire also has a bar shape) having a rectangular cross section or a round cross section. The conductor 27 is formed by extrusion molding the insulator 28 (made of a resin material having insulation properties) on an outer surface of the conductor 27.

Here, the shield member 25 is an electromagnetic shield member (that is, a shield member acting as a countermeasure for electromagnetic waves) that collectively covers the two high voltage circuits 24, and adopts a well-known cylindrical braid into which a plurality of element wires are braided. The shield member 25 is formed so as to have substantially the same length as the full length of the two high voltage circuits 24. For example, the shield member 25 may be formed of a metal foil having conductivity, or a member containing the metal foil insofar as the material can act as a countermeasure for electromagnetic waves.

The shield member 25 is disposed in the heat source cover member while being interposed between the insulator 28 and the sheath 26.

The sheath 26 is formed by extrusion molding a resin material having insulation properties and a predetermined thickness on an outer side of the shield member 25, and is disposed in an outermost layer of the high voltage conductive path 22. The sheath 26 may not be provided, and the shield member 25 may be disposed in the outermost layer.

The exterior member 23 is a modification of the radiator hose protective member 6 (refer to FIGS. 1A to 2B) in Embodiment 1. That is, the exterior member 23 is formed by modifying the radiator hose protective member 6 to be flat and to have a track-shaped cross section. Reference sign 29 denotes a non-flexible tube portion (that is, a second tube body portion) of the exterior member 23. Reference sign 30 denotes an outer surface of the non-flexible tube portion, and reference sign 31 denotes an inner surface thereof.

Since a non-flexible tube portion 29 is formed flat, a flat surface 32 is formed in the inner surface 31. The flat surface 32 is a flat surface without a curved surface, and does not have concavities and convexities. The flat surface 32 can be in surface contact with the high voltage conductive path 22, thereby increasing a contact area.

With the above-mentioned configuration and structure, heat originating from the conductor 27 associated with its energization is drawn to the sheath 26 due to the shield member 25. Since the sheath 26 is in surface contact with the inner surface 31 (that is, the flat surface 32) of the non-flexible tube portion 29 of the exterior member 23, the drawn heat is transferred a main body of the exterior member 23. The heat moves in a direction illustrated by arrow H, and finally, the heat is emitted (in other words, dissipated) from the outer surface 30 of the exterior member 23.

As described above with reference to FIGS. 3A and 3B, in the wire harness 21, since it is possible to increase a contact area via the inner surface 31 of the non-flexible tube portion 29, heat originating from the high voltage conductive path 22 can be efficiently transferred to the exterior member 23 and be dissipated.

In the wire harness 21, since the exterior member 23 is made of resin having good emissivity, it is possible to prevent heat from being trapped in the exterior member 23 compared to the exterior member 23 made of pure metal.

In regard to a routing path of the wire harness 21, when the long non-flexible tube portion 29, that is, the portion having a large area in contact with the heat source, is disposed in the vehicle underfloor region, heat can be efficiently dissipated.

In addition, when the long non-flexible tube portion 29 is disposed in the vehicle underfloor region, the non-flexible tube portion 29 extends in a horizontal direction, and thereby only the weight of the high voltage conductive path 22 allows the high voltage conductive path 22 to be in contact with the inner surface 31 (that is, the flat surface 32) of non-flexible tube portion 29.

Embodiment 3

Figure 4A:
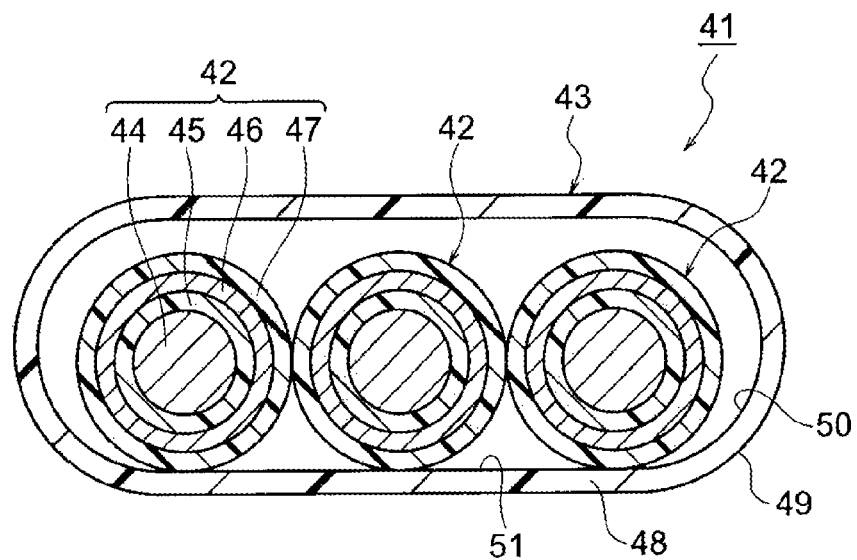
FIGS. 4A and 4B are views illustrating a wire harness that is a line-shaped assembly of Embodiment 3.
Figure 4B:
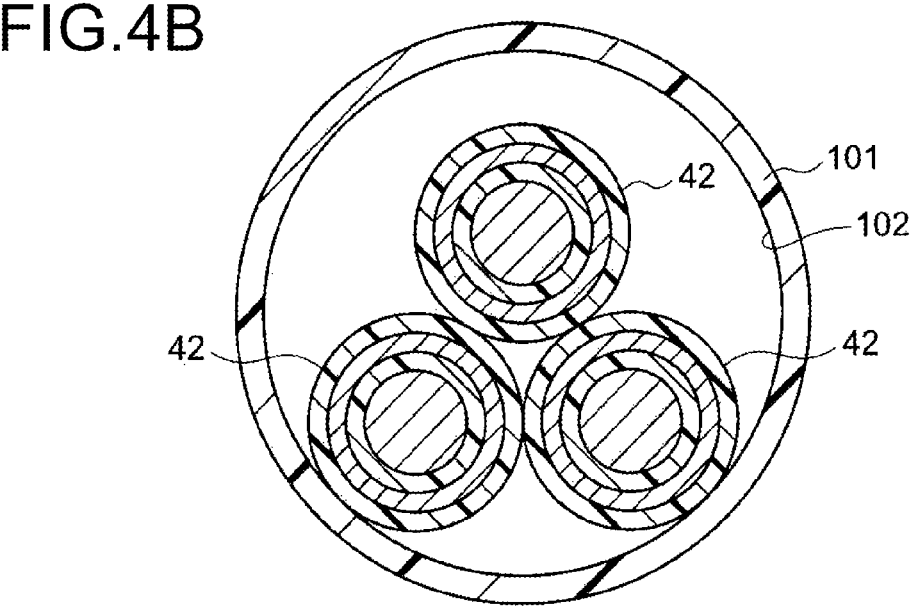

Hereinafter, Embodiment 3 will be described with reference to FIGS. 4A to 4B. FIGS. 4A and 4B are views illustrating a wire harness that is a line-shaped assembly of Embodiment 3, FIG. 4A is a vertical cross-sectional view, and FIG. 4B is a vertical cross-sectional view illustrating a comparative example.

In FIG. 4A, reference sign 41 denotes a wire harness equivalent to the line-shaped assembly. A wire harness 41 is routed so as to electrically connect the inverter unit (not illustrated) and a motor unit (not illustrated). The wire harness 41 includes three high voltage conductive paths (that is, heat sources) 42 and a flat exterior member (that is, a heat source protective member) 43 that accommodates and protects the three high voltage conductive paths 15 lining up laterally, and has a track-shaped cross section.

The high voltage conductive path 42 is a high voltage shielded electrical wire, and includes a conductor (that is, a heat source main body) 44 made of metal having conductivity; an insulator (that is, a heat source cover member) 45 that is made of resin, and insulates and covers the conductor 44; a shield member (that is a metal member) 46 that is made of metal and is provided on an outer side of the insulator 45; and a sheath (that is, a heat source cover member) 47 that is made of resin and is provided on an outer side of the shield member 46.

The exterior member 43 is formed by increasing the lateral length of the exterior member 23 (refer to FIGS. 3A and 3B) in Embodiment 2. Reference sign 48 denotes a non-flexible tube portion (that is, a second tube body portion) of the exterior member 43. Reference sign 49 denotes an outer surface of the non-flexible tube portion, and reference sign 50 denotes an inner surface thereof. Since a non-flexible tube portion 48 is formed flat, a flat surface 51 is formed in the inner surface 50. The flat surface 51 can be in contact with each of the three high voltage conductive paths 42, thereby increasing a contact area.

With the above-mentioned configuration and structure, heat originating from the energized conductor 44 is drawn to the sheath 47 due to the shield member 46. Since the sheath 47 is in contact with the inner surface 50 (that is, the flat surface 51) of the non-flexible tube portion 48 of the exterior member 43, the drawn heat is transferred a main body of the exterior member 43. Finally, the heat is emitted (in other words, dissipated) from the outer surface 49 of the exterior member 43.

As described above with reference to FIGS. 4A and 4B, in the wire harness 41, since it is possible to increase a contact area via the inner surface 50 of the non-flexible tube portion 48, heat originating from the high voltage conductive path 42 can be efficiently transferred to the exterior member 43 and be dissipated.

In a comparative example illustrated in FIG. 4B, only two of the three high voltage conductive paths 42 are in contact with an inner surface 102 of an exterior member 101 having a circular cross section. Accordingly, when the number of high voltage conductive paths 42 increases, the flat exterior member 43 as illustrated in FIG. 4A is effective in heat transfer. In addition, the flat exterior member 43 is effective in lowering the height of the wire harness.

Various modifications can be made to the present invention insofar as the modifications do not depart from the main spirit of the present invention.

Hereinafter, the configuration of the line-shaped assembly according to the embodiments will be summarized.

(1) A line-shaped assembly (a radiator hose unit 1, a wire harness 21, or a wire harness 41) according to an embodiment includes a heat source (a heat source 4, a high voltage conductive path 22, or a high voltage conductive path 42) that includes a heat source main body (a coolant 2, a conductor 27, or a conductor 44) extending straightly, and a heat source cover member (a radiator hose 3, a sheath 26, or a sheath 47) covering the heat source main body; and a tubular-shaped heat source protective member (a radiator hose protective member 6, an exterior member 23, or an exterior member 43) that accommodates and protects the heat source. The heat source protective member is made of resin, and includes a first tube body portion (a flexible tube portion 9) with an inner surface that has a small area per unit length in an axial direction of the heat source protective member in contact with the heat source, and a second tube body portion (a non-flexible tube portion 10, a non-flexible tube portion 29, or a non-flexible tube portion 48) with an inner surface that has a contact area larger than that of the first tube body portion.

(2) In the line-shaped assembly (the wire harness 21 or the wire harness 41) according to the embodiment, the second tube body portion (the non-flexible tube portion 29 or the non-flexible tube portion 48) is formed so as to include a flat inner surface (32 or 51).

(3) In the line-shaped assembly (the radiator hose unit 1, the wire harness 21, or the wire harness 41) according to the embodiment, the heat source protective member (the radiator hose protective member 6, the exterior member 23, or the exterior member 43) is integrally molded in such a manner that the first tube body portion (the flexible tube portions 9) and the second tube body portion (the non-flexible tube portions 10, the non-flexible tube portions 29, or the non-flexible tube portions 48) are successive in the axial direction of the heat source protective member.

(4) The line-shaped assembly (the radiator hose unit 1, the wire harness 21, or the wire harness 41) according to the embodiment is attached to an interior and exterior of a structural body (for example, an engine, a radiator, an inverter unit, or a battery), and at least a part of the second tube body portion (the non-flexible tube portions 10, the non-flexible tube portions 29, or the non-flexible tube portions 48) of the heat source protective member (the radiator hose protective member 6, the exterior member 23, or the exterior member 43) is disposed in the exterior of the structural body.

(5) The line-shaped assembly (the radiator hose unit 1, the wire harness 21, or the wire harness 41) according to the embodiment is disposed in the exterior of the structural body so that the second tube body portion (the non-flexible tube portions 10, the non-flexible tube portions 29, or the non-flexible tube portions 48) extends in a substantially horizontal direction.

(6) In the line-shaped assembly (the wire harness 21 or the wire harness 41) according to the embodiment, the metal member (the shield member 25 or the shield member 46) is disposed in the heat source cover member (the sheath 26 or the sheath 47) of the heat source (the high voltage conductive path 22 or the high voltage conductive path 42) while being close to the heat source protective member (the exterior member 23 or the exterior member 43). In the line-shaped assembly (the radiator hose 1) according to the embodiment, the metal member 5 is disposed on an outer surface of the heat source cover member (the radiator hose 3) while being in contact with the heat source protective member (the radiator hose protective member 6).

(7) In the line-shaped assembly (the wire harness 21 or the wire harness 41) according to the embodiment, the heat source is a conductive path (the high voltage conductive path 22 or the high voltage conductive path 42), the metal member is a conductive shied member (the shield member 25 or the shield member 46), and the heat source protective member is an exterior member (the exterior member 23 or the exterior member 43) with no slit.

(8) In the line-shaped assembly (the wire harness 21 or the wire harness 41) according to the embodiment, the conductive path is a high voltage conductive path (the high voltage conductive path 22 or the high voltage conductive path 42), and the high voltage conductive path and the exterior member (the exterior member 23 or the exterior member 43) are formed to be long so as to be routed from a front side to a rear side of an vehicle floor through under the vehicle floor.

The line-shaped assembly according to the present invention is effective in that heat originating from the heat source can be efficiently transferred to the heat source protective member, and be dissipated.

What is claimed is:

1. A line-shaped assembly comprising:
a heat source that includes a heat source fluid flowing straightly, and a heat source cover member covering the heat source fluid;
a metal member disposed on an outer surface of the heat source cover member; and
a tubular-shaped heat source protective member that accommodates and protects the heat source, the metal member being in contact with the heat source protective member so as to draw heat from the heat source fluid;
wherein the heat source protective member is made of resin, and includes a first tube body portion formed in a bellows shape having a concave portion and a convex portion, the first tube body portion having an inner surface, that has a first area per unit length in an axial direction of the heat source protective member, in contact with the metal member, and a second tube body portion having an inner surface that has a second area per unit length in contact with the metal member, the second area per unit length being larger than the first area per unit length of the first tube body portion when the first tube body portion and the second tube body portion are in a straight, unbent configuration.

2. The line-shaped assembly according to claim 1, wherein the second tube body portion is formed so as to include a flat inner surface.

3. The line-shaped assembly according to claim 1, wherein the heat source protective member is integrally molded so that the first tube body portion and the second tube body portion are successive in the axial direction of the heat source protective member.

4. The line-shaped assembly according to claim 1, wherein the line-shaped assembly is attached to an interior and an exterior of a structural body; and wherein at least a part of the second tube body portion of the heat source protective member is disposed on the exterior of the structural body.

5. The line-shaped assembly according to claim 4, wherein the line-shaped assembly is disposed on the exterior of the structural body so that the second tube body portion extends in a substantially horizontal direction.

6. The line-shaped assembly according to claim 1, wherein the heat source is a conductive path;
 wherein the metal member is a conductive shield member; and
 wherein the heat source protective member is an exterior member with no slit.

7. The line-shaped assembly of claim 1, wherein the metal member covers an entirety of the heat source.

8. The line-shaped assembly of claim 1, wherein the metal member surrounds the entirety of the heat source.

9. The line-shaped assembly of claim 1, wherein the metal member is disposed at positions in which the metal member is in contact with the heat source protective member.

10. The line-shaped assembly of claim 9, wherein the metal member is disposed only at positions in which the metal member is in contact with the heat source protective member.

* * * * *